(12) United States Patent
Park

(10) Patent No.: US 7,677,842 B2
(45) Date of Patent: Mar. 16, 2010

(54) INSERT TIP

(75) Inventor: Chang Gyu Park, Taegu (KR)

(73) Assignee: Taegutec Co., Taegu (KR)

( * ) Notice: Subject to any disclaimer, the term of this patent is extended or adjusted under 35 U.S.C. 154(b) by 2 days.

(21) Appl. No.: 11/719,456

(22) PCT Filed: Aug. 31, 2005

(86) PCT No.: PCT/KR2005/002878

§ 371 (c)(1),
(2), (4) Date: Mar. 28, 2008

(87) PCT Pub. No.: WO2006/054824

PCT Pub. Date: May 26, 2006

(65) Prior Publication Data

US 2008/0193233 A1 Aug. 14, 2008

(30) Foreign Application Priority Data

Nov. 16, 2004 (KR) .................. 10-2004-0093516

(51) Int. Cl.
*B23C 5/00* (2006.01)
*B23B 27/16* (2006.01)
(52) U.S. Cl. ..................... 407/113; 407/103
(58) Field of Classification Search .................. 407/48, 407/40, 53, 33, 34, 64, 103–105, 87, 97, 407/113–116
See application file for complete search history.

(56) References Cited

U.S. PATENT DOCUMENTS 6,579,042 B1 * 6/2003 Shiraiwa ................. 407/35

7,021,871 B2 * 4/2006 Arvidsson et al. ........... 407/113
2004/0223819 A1 11/2004 Sheffler et al.

FOREIGN PATENT DOCUMENTS

| EP | 1 197 281 | 4/2002 |
| GB | 1 385 251 | 2/1975 |
| JP | 46-2897 | 10/1971 |
| JP | 5-49203 | 6/1993 |
| WO | 03 022495 | 3/2003 |

OTHER PUBLICATIONS

U.S. Appl. No. 12/440,078, filed Mar. 5, 2009, Choi et al.

* cited by examiner

*Primary Examiner*—Will Fridie, Jr.
(74) *Attorney, Agent, or Firm*—Oblon, Spivak, McClelland, Maier & Neustadt, L.L.P.

(57) ABSTRACT

An insert tip used when steel or cast iron is worked, in which clearance portions are provided inside bolt holes formed in the insert tip to slantingly fit a bolt into the bolt holes, the bolt serving to fix the insert tip to a cutter body, so that more insert tips can be firmly fixed to the cutter body. To this end, in an insert tip including bolt holes that cause upper and lower surfaces of a plate shaped body to communicate with each other, the plate shaped body having a cutting edge at each corner portion, the insert tip being fixed to a cutter body by a bolt fitted into the bolt holes, clearance portions are formed at a portion direction toward each corner portion of the insert tip among inner side portions of the bolt holes to prevent interference between the bolt holes and the bolt if the bolt is slantingly fitted from one corner portion of the insert tip, where the insert tip is worked, to its opposite corner portion.

12 Claims, 9 Drawing Sheets

[Fig. 1]
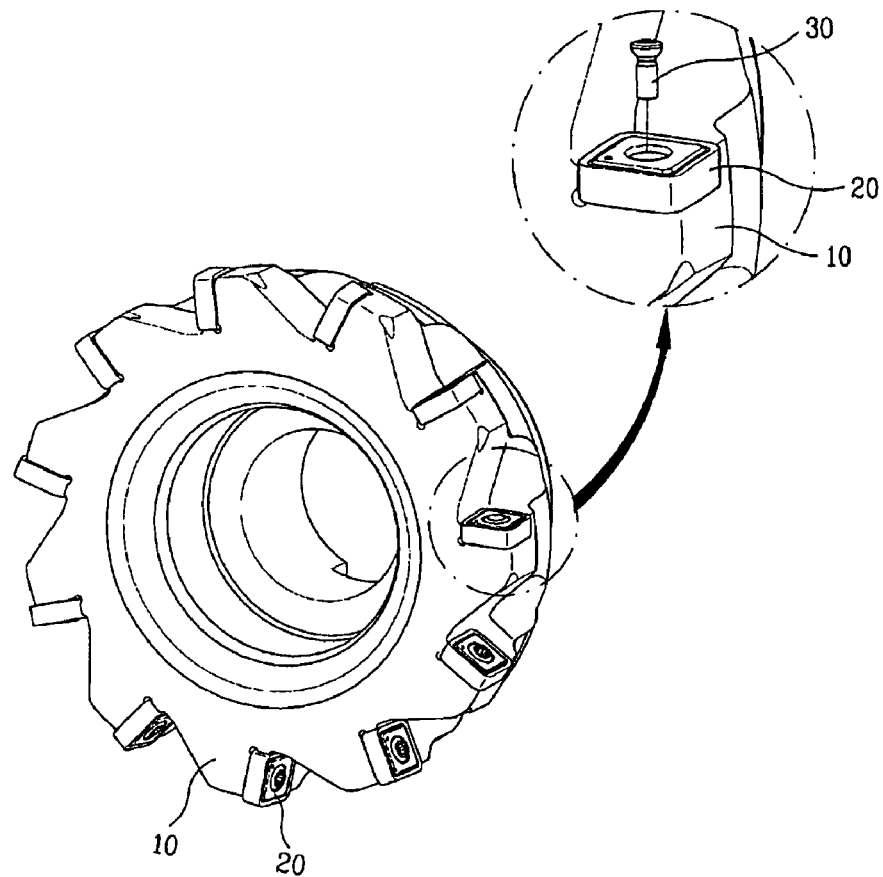
[Fig. 2]
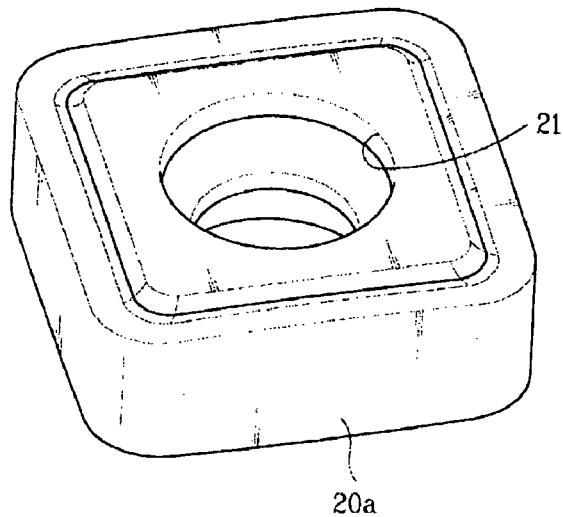

[Fig. 3]
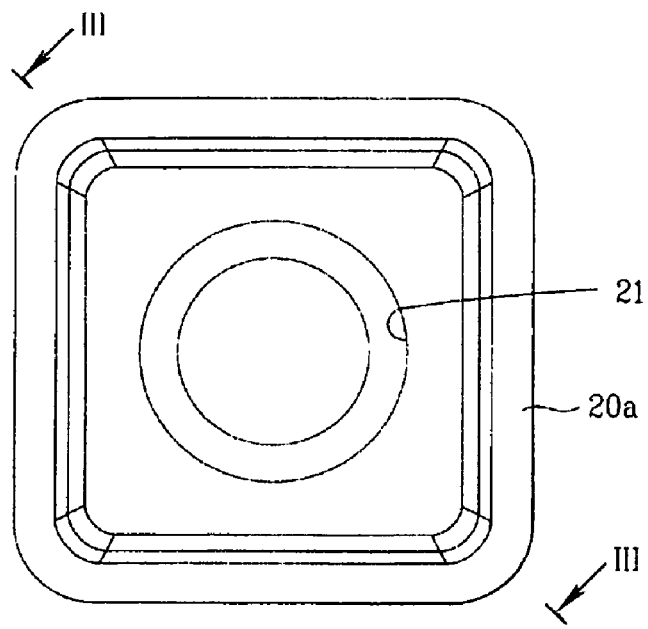
[Fig. 4]
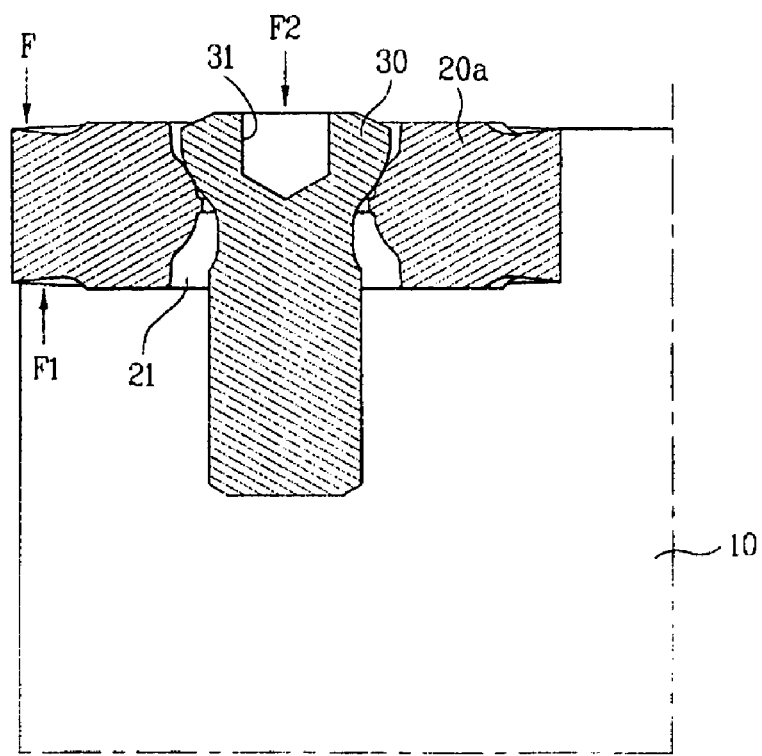

[Fig. 5]
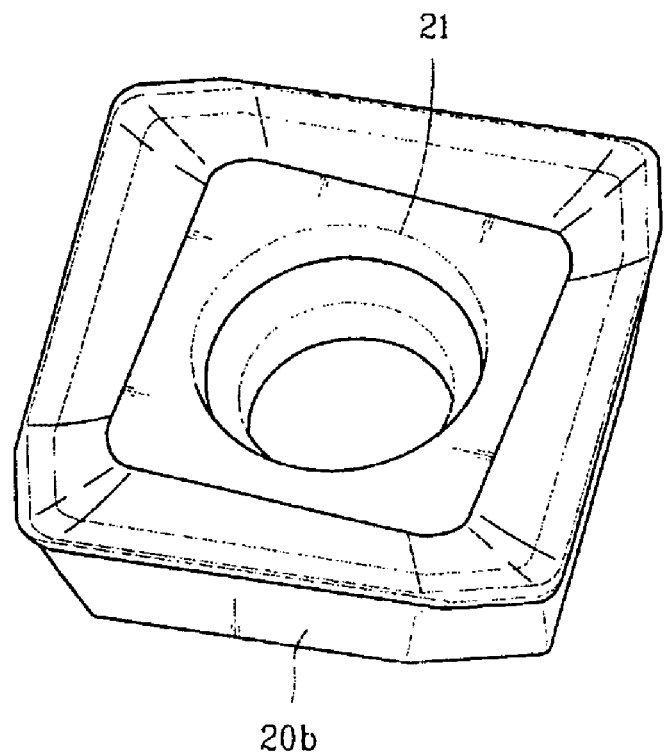
[Fig. 6]
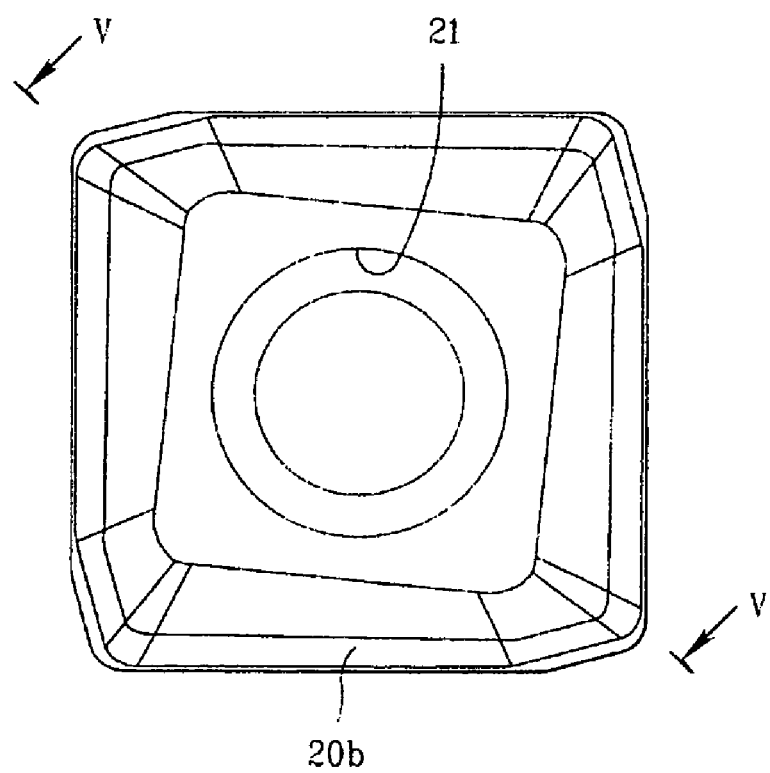

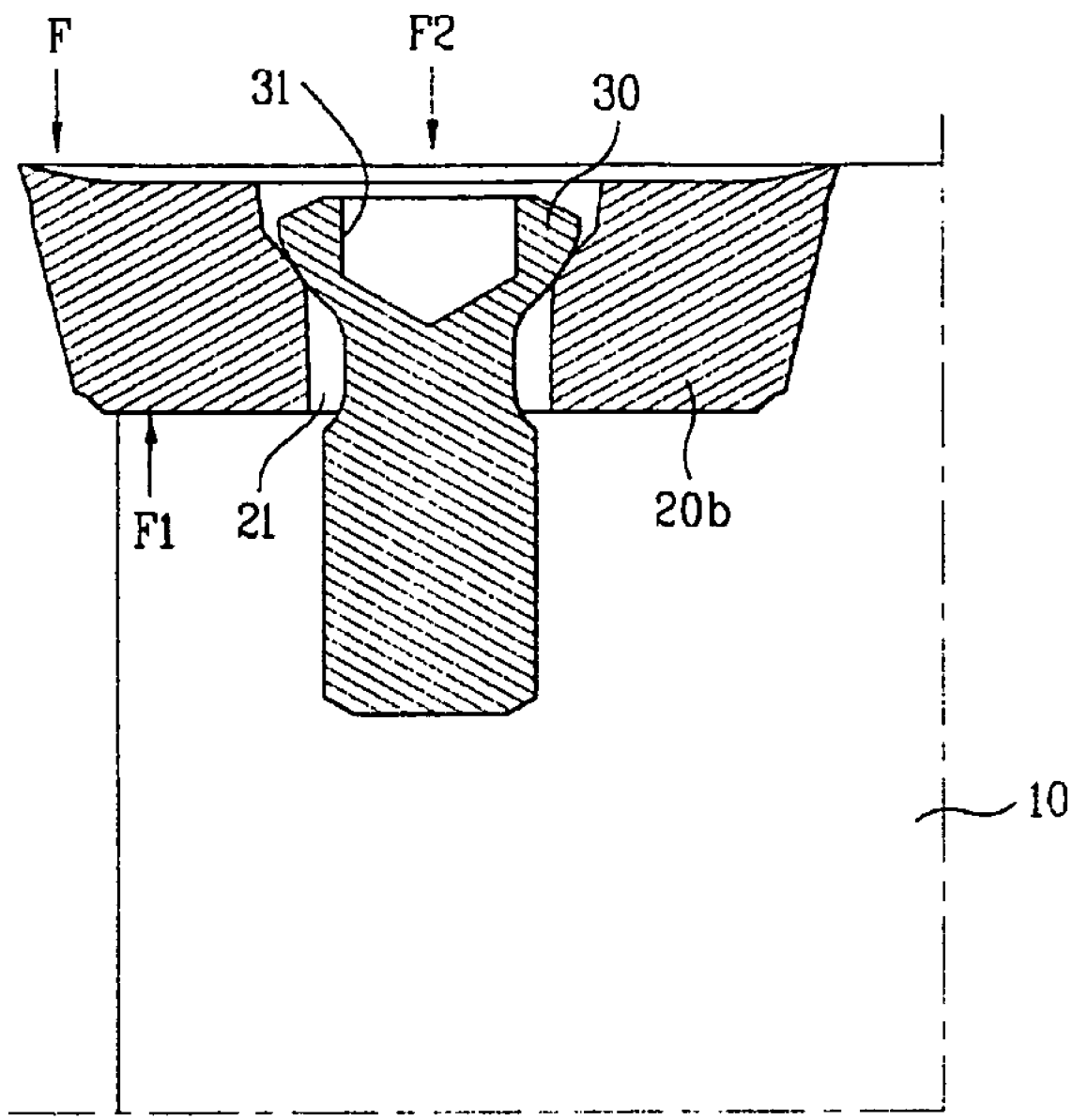
[Fig. 7]

[Fig. 8]
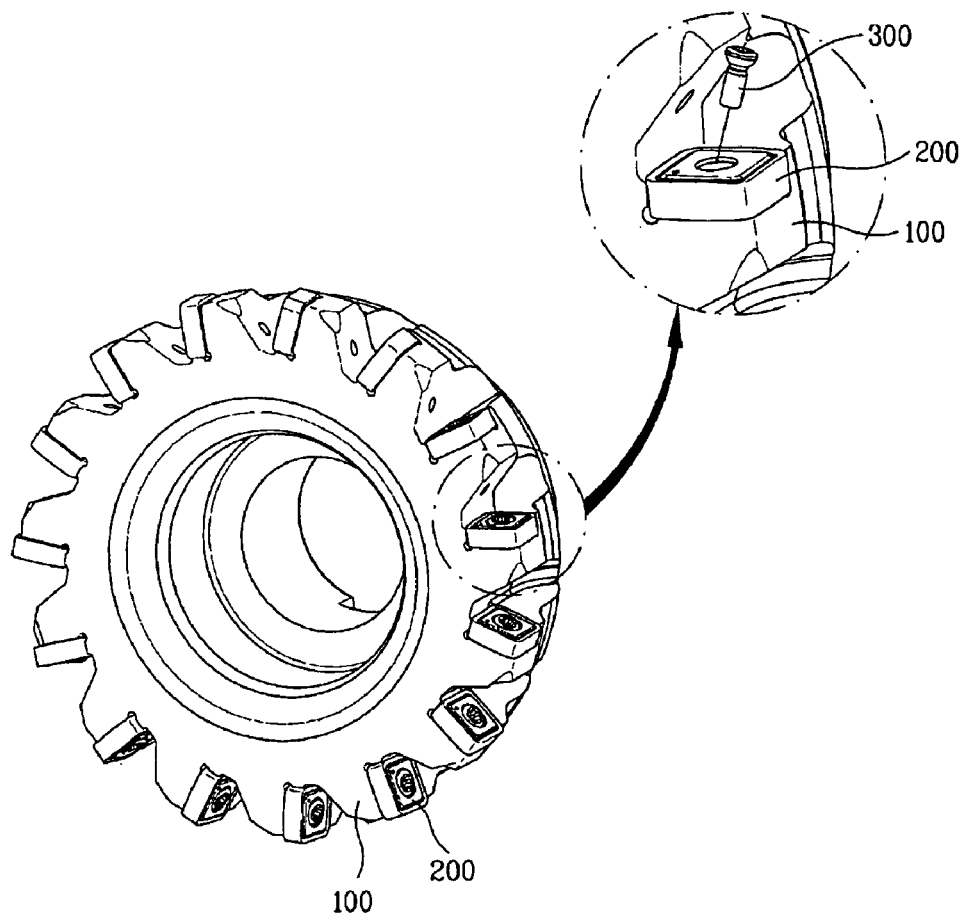
[Fig. 9]
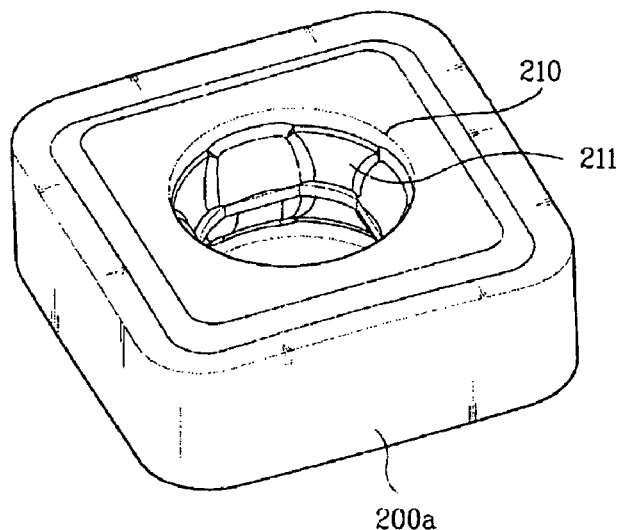

[Fig. 10]
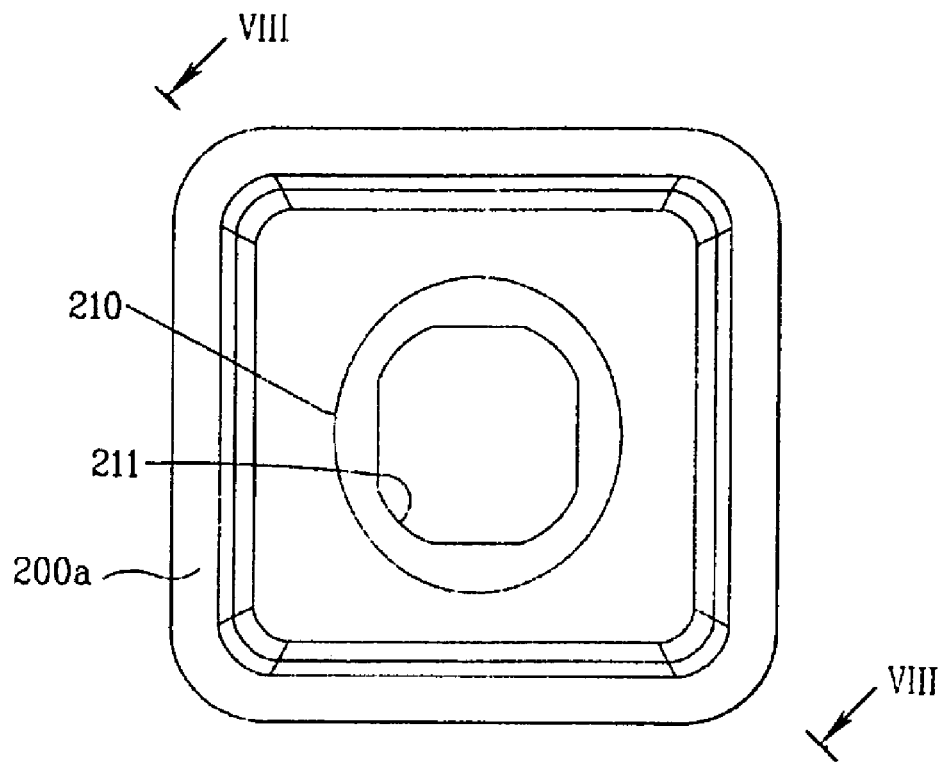
[Fig. 11]
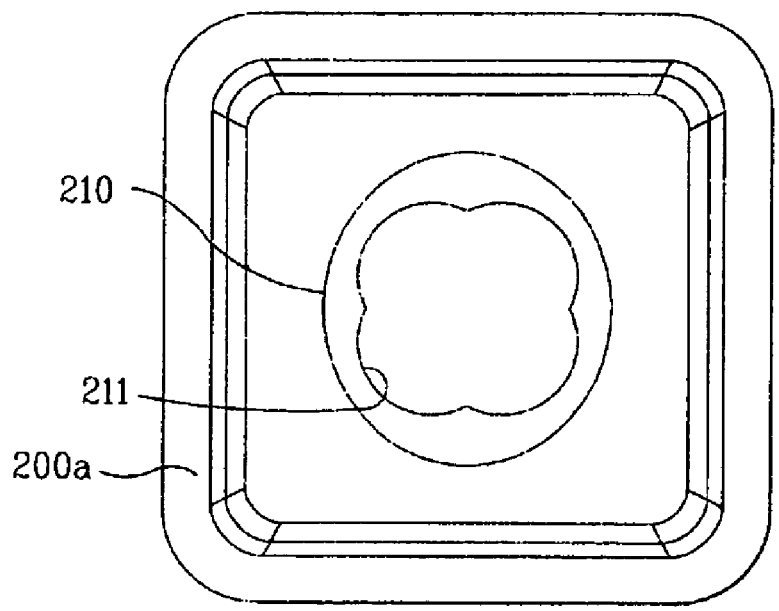

[Fig. 12]
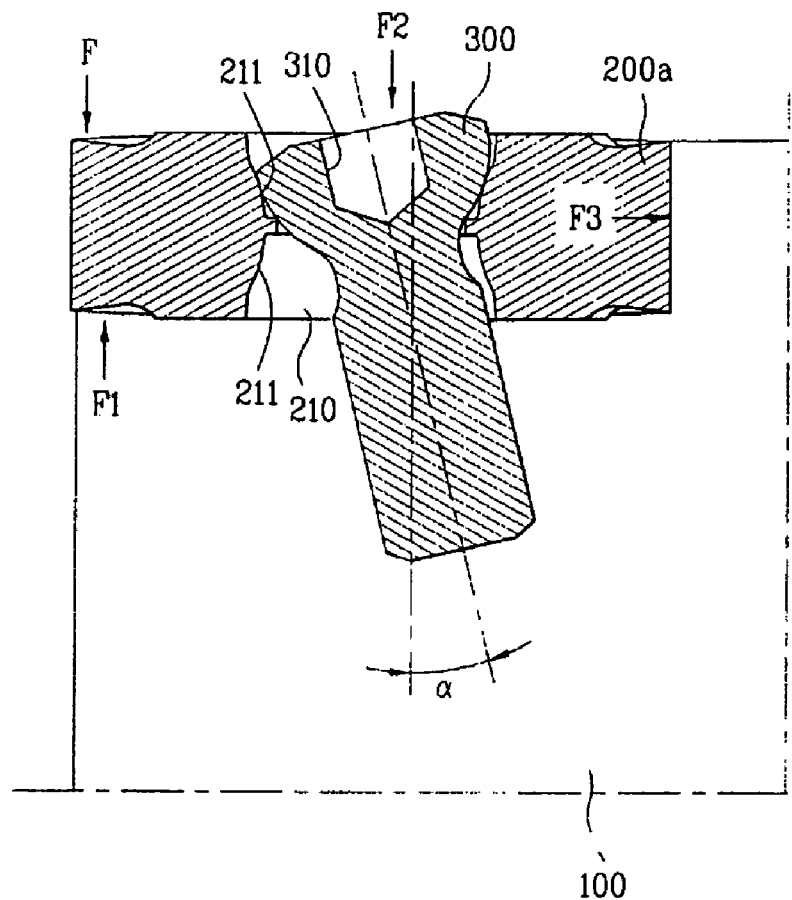
[Fig. 13]
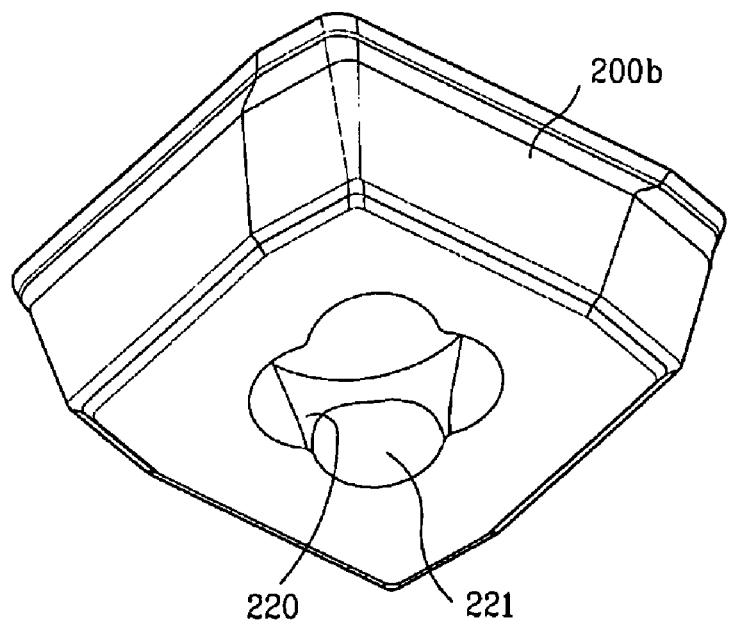

[Fig. 14]
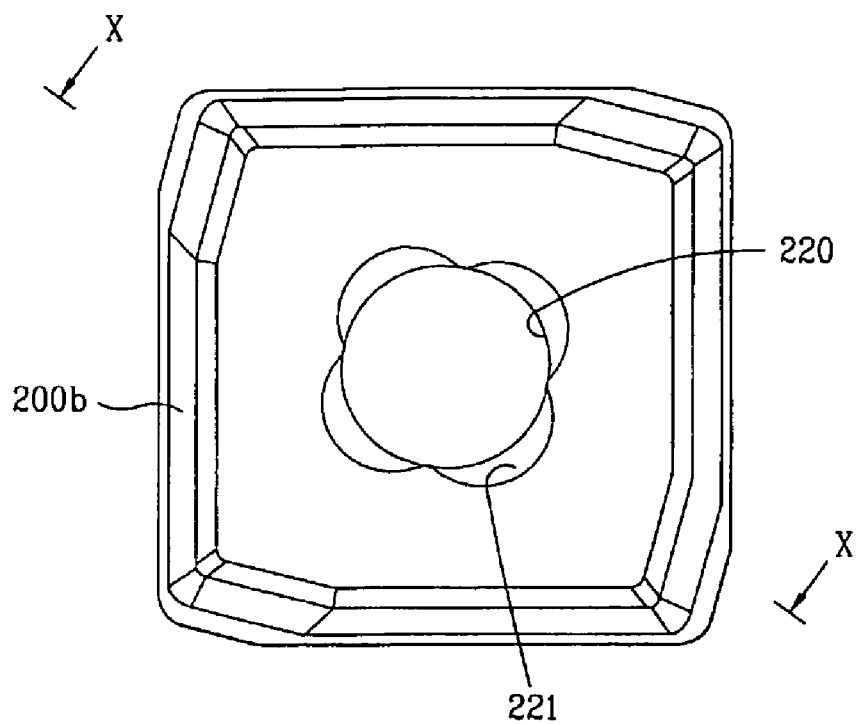
[Fig. 15]
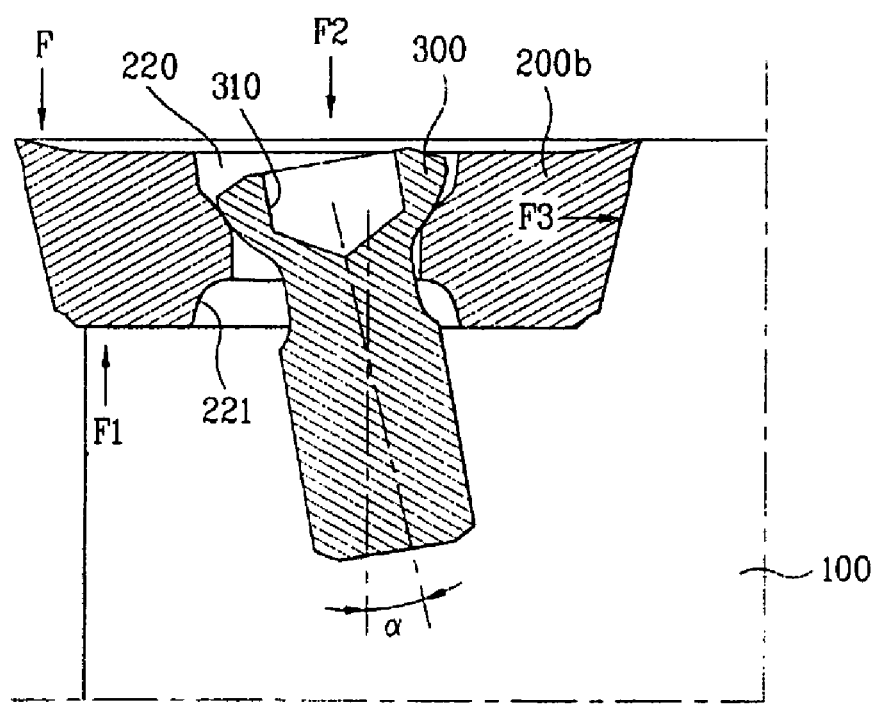

[Fig. 16]
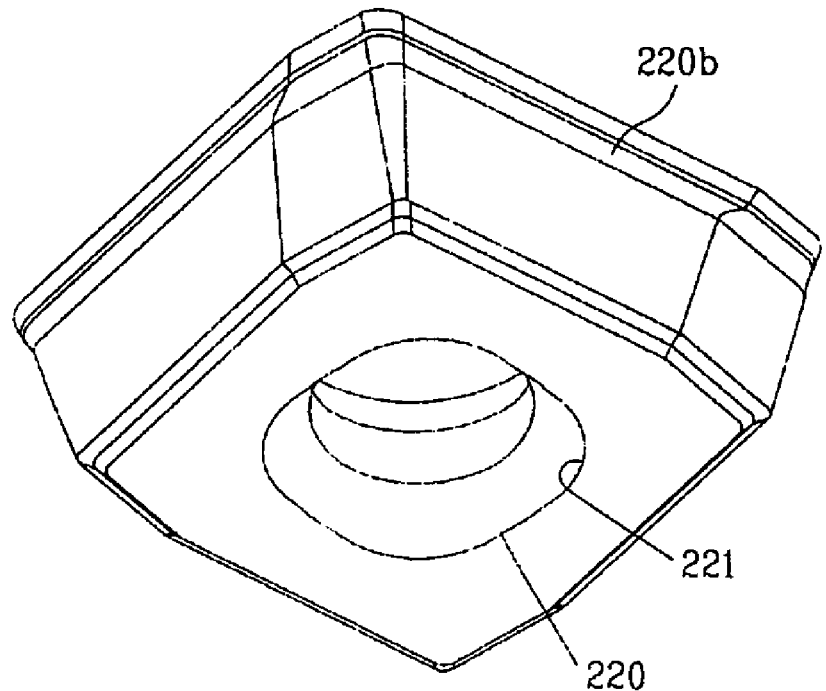
[Fig. 17]
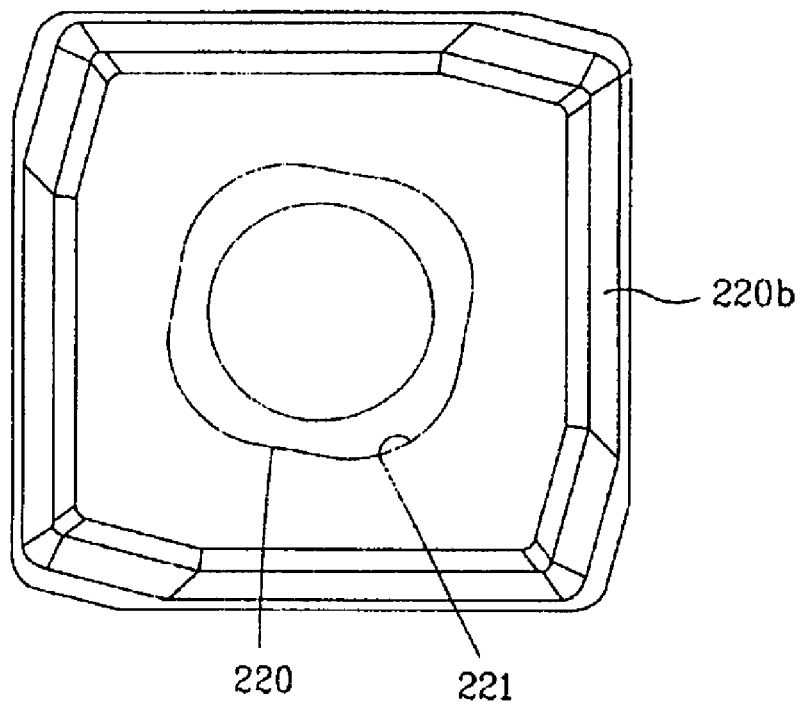

INSERT TIP

TECHNICAL FIELD

Disclosed is an insert tip used when steel or cast iron is worked, in which redundant portions are provided inside bolt holes formed in the insert tip to slantingly fit a bolt into the bolt holes, the bolt serving to fix the insert tip to a cutter body, so that more insert tips can be fly fixed to the cutter body.

BACKGROUND ART

Generally, an insert tip is an element of a cutter used to work steel or cast iron and is made of cemented carbide. The insert tip is fixed to a cutter body of steel by a bolt and the like, so as to cut a to-be-cut material as a cutter rotates.

Hereinafter, a related art insert tip will briefly be described with reference to FIG. 1 to FIG. 7.

FIG. 1 is a perspective view illustrating a cutter in which a related art insert tip is used. As shown, the related art cutter includes a cutter body 10 constituting a body, and an insert tip 20 fixed to the cutter body 10. The insert tip 20 fixed to the cutter body 10 cuts a to-be-cut material as the cutter rotates.

FIG. 2 is a perspective view illustrating an example of the related art insert tip, FIG. 3 is a plane view of FIG. 2, and FIG. 4 is a sectional view taken along line III-III of FIG. 3, illustrating the state that the insert tip is fixed to the cutter body.

First, the insert tip shown in FIG. 2 is a double-edged insert tip 20a and has a substantially hexahedral shape. The double-edged insert tip 20a cuts the to-be-cut material using a cutting edge provided at each corner portion of upper and lower surfaces. A bolt hole 21 is formed at a center area of the double-edged insert tip 20a to receive a bolt 30 therein, which fixes the double-edged insert tip 20a to the cutter body 10.

The bolt hole 21 is gradually tapered toward the center portion to insert a head portion of the bolt 30 therein.

In this case, the double-edged insert tip 20a may use the cutting edge at the upper surface. Alternatively, the double-edged insert tip 20a may use the cutting edge at the lower surface if it is reversed. Therefore, the inside of the bolt hole 21 is symmetrically formed up and down around its center portion.

FIG. 5 is a perspective view illustrating another example of the insert tip constituting the related art cutter, FIG. 6 is a plane view of FIG. 5, and FIG. 7 is a sectional view taken along line IV-IV of FIG. 6, illustrating the state that the insert tip is fixed to the cutter body.

The insert tip shown in FIG. 5 is a single-edged insert tip 20b and cuts the to-be-cut material using a cutting edge respectively provided only at four corner portions of an upper surface. A bolt hole 21 is formed at a center area of the single-edged insert tip 20b to receive a bolt 30 therein, which fixes the single-edged insert tip 20b to the cutter body 10.

Furthermore, since the single-edged insert tip 20b uses only the draw-out line at the upper surface, it does not have to be reversed. Therefore, the inside of the bolt hole 21 is not required to be symmetrically formed up and down, unlike the double-edged insert tip 20a.

In the related art insert tips 20 constructed as above, a wrench (not shown) is inserted into a wrench insertion hole 31 of the bolt 30, and the bolt 30 is rotated to fix the insert tips 20 to the cutter body 10. Then, the cutter is rotated to cut the to-be-cut material.

DISCLOSURE OF INVENTION

Technical Problem

However, the related art insert tips 20 have several problems. If a to-be-cut material having high hardness, such as steel or cast iron, is worked, the number of insert tips 20 fixed to the cutter is insufficient. For this reason it takes a long working time, and surface roughness is low because of a rough working surface. Moreover, chipping occurs in the cutting edge provided at each corner portion of the insert tips.

Furthermore, a cutting force F in a rotational direction and a reaction force F1 corresponding to the cutting force F act on the related art insert tips 20. The reaction force F1 is supported by only a fitting force F2 of the bolt 30 that secures the insert tips 20 to the cutter body 10. In this case, it is difficult to obtain the sufficient fitting force. As a result, the insert tips 20 fail to be firmly fixed to the cutter body 10 because of the insufficient fitting force.

As described above, if the insert tip is not firmly fixed to the cutter body 10, stress is concentrated on one side of the insert tip 20. For this reason, the insert tip 20 may be damaged during working process.

Technical Solution

Accordingly, an object of the present invention is to provide an insert tip for a cutter in which the insert tip is firmly fixed to a cutter body using only a fitting force of a bolt, working time of a to-be-cut material is short, and surface roughness is high.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a perspective view illustrating a cutter in which a related art insert tip is used;

FIG. 2 is a perspective view illustrating an example of a related art insert tip;

FIG. 3 is a plane view of FIG. 2;

FIG. 4 is a sectional view taken along line III-III of FIG. 3, illustrating the state that an insert tip is fixed to a cutter body;

FIG. 5 is a perspective view illustrating another example of a related art insert tip;

FIG. 6 is a plane view of FIG. 5;

FIG. 7 is a sectional view taken along line IV-IV of FIG. 6, illustrating the state that an insert tip is fixed to a cutter body;

FIG. 8 is a perspective view illustrating a cutter in which an insert tip according to the embodiment of the present invention is used;

FIG. 9 is a perspective view illustrating an example of an insert tip according to one embodiment of the present invention;

FIG. 10 is a plane view of FIG. 9;

FIG. 11 is a plane view illustrating another example of an insert tip of FIG. 9;

FIG. 12 is a sectional view taken along line VIII-VIII of FIG. 10, illustrating the state that an insert tip is fixed to a cutter body;

FIG. 13 is a rear perspective view illustrating an insert tip according to the other embodiment of the present invention;

FIG. 14 is a rear view of FIG. 13;

FIG. 15 is a sectional view taken along line X-X of FIG. 14, illustrating the state that an insert tip is fixed to a cutter body;

FIG. 16 is a rear perspective view illustrating another example of an insert tip of FIG. 13; and FIG. 17 is a rear view of FIG. 16.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an insert tip according to the embodiment of the present invention will be described in detail with reference to FIG. 8 to FIG. 17.

FIG. 8 is a perspective view illustrating a cutter in which an insert tip according to the embodiment of the present invention is used. As shown, the cutter includes a cutter body 100 constituting a body, and an insert tip 200 fixed to the cutter body 100. The insert tip 200 fixed to the cutter body 100 cuts a to-be-cut material as the cutter rotates.

FIG. 9 is a perspective view illustrating an example of an insert tip according to one embodiment of the present invention, FIG. 10 is a plane view of FIG. 9, FIG. 11 is a plane view illustrating another example of the insert tip of FIG. 9, and FIG. 12 is a sectional view taken along line VIII-VIII of FIG. 10, illustrating the state that the insert tip is fixed to the cutter body by a bolt.

The insert tip shown in FIG. 9 is a double-edged insert tip 200a and has a substantially hexahedral plate shape. The double-edged insert tip 200a is symmetrically formed up and down to cut the to-be-cut material using a cutting edge provided at each corner portion of upper and lower surfaces.

A bolt hole 210 is formed at a center area of the double-edged insert tip 200a, and communicates upper and lower surfaces of the double-edged insert tip with each other to receive a bolt 300 therein, which fixes the double-edged insert tip 200a to the cutter body 100.

A clearance portion 211 is formed at an inner side of the bolt hole 210 so that the bolt 300 can be fitted into the bolt hole 210 at a predetermined slant toward the cutter body 100 based on a vertical line of the cutter body 100 that adjoins the bottom of the double-edged insert tip 200a.

As shown in FIG. 10, if the bolt 300 is fitted to the cutter body 100 at a predetermined slant angle α from each corner portion of the double-edged insert tip 200a to its opposite corner portion, the clearance portion 211 is respectively formed at the inner side of the bolt hole 210 directed toward each corner portion of the double-edged insert tip 200a among inner sides of the bolt hole 210 to avoid interference between the bolt 300 and the bolt hole 210.

Further, since double-edged insert tip 200a may use either the cutting edge at the surface or the cutting edge at the lower surface, the inside of the bolt hole 210 is preferably formed to make a symmetrical shape up and down around its center portion.

In the double-edged insert tip 200a according to the embodiment of the present invention, the bolt 300 is fitted to the cutter body 10 at a predetermined slant angle α from one corner portion of the double-edged insert tip 200a to its opposite corner portion, wherein the double-edged insert tip 200a cuts the to-be-cut material in a state that interference between the bolt 300 and the bolt hole 210 is avoided. In this case, since the portion of the cutter body 100 required to fit the bolt 300 is reduced, the number of double-edged insert tips 200a more than the number of the related art double-edged insert tips can be fixed to the cutter having the same diameter as that of the related art cutter.

Furthermore, since the bolt 300 is fitted to the cutter body 100 at a predetermined slant angle α from one corner portion of the double-edge insert tip 200a to its opposite corner portion, wherein the double-edged insert tip 200a cuts the to-be-cut material in a state that interference between the bolt 300 and the bolt 210 is avoided lateral pressure F3 as well as a fitting force F2 in a vertical direction acts on the double-edged insert tip 200 fixed to the cutter body 100 to correspond to a reaction force F1 caused by a cutting force F during cutting working. Therefore, the fitting force between the cutter body 100 and the double-edged insert tip 200a is increased.

Particularly, if the angle α of the bolt 300 fitted into the cutter body 100 is less than 8° the lateral pressure F3 acting on the double-edged insert tip 200a becomes too weak. If the angle α of the bolt 300 fitted into the cutter body 100 is greater than 20° the fitting force F2 in a vertical direction acting on the double-edged insert tip 200a becomes insufficient, thereby resulting in that the double-edged insert tip 200a fails to be firmly fixed to the cutter body 100. Therefore, the clearance portion 211 is preferably recessed at each corner portion of the inner sides of the bolt hole 210 so that the slant angle α of the bolt 300 is in the range of 8° to 20°.

FIG. 11 is a plane view illustrating another clearance portion 211 formed in the bolt hole 210 of the double-edged insert tip 200a. The clearance portion 211 may have various shapes depending on the size and the shape of the bolt 300 or the slant degree of the bolt 300.

Meanwhile, as another example of the insert tip according to the present invention, the redundant portion may be formed only at the lower portion of the insert tip.

In other words, since a single-edged insert tip 200b shown in FIG. 13 is provided with a cutting edge only at four corner portions of the upper surface, it does not have to be reversed. Therefore, a clearance portion 221 is only formed below the bolt 220.

FIG. 16 is a rear perspective view illustrating another example of the insert tip of FIG. 13, and FIG. 17 is a rear view of FIG. 16. The clearance portion 221 may be formed at some of the bolt hole 220 and may wholly be formed below the bolt hole 220.

In this case, the clearance portion 221 is formed so that the bolt 300 is fitted at a predetermined slant angle α toward the cutter body 100 based on the vertical line of the cutter body 100 adjoining the bottom of the single-edged insert tip 200b. The angle α is preferably in the range of 8° to 20°.

The aforementioned insert tip 200 of the present invention is inserted into a wrench insertion hole 310 formed at a head portion of the bolt 300, and the bolt 300 is rotated to fix the insert tip 200 to the cutter body 100. Then, the cutter is rotated to cut the to-be-cut material (not shown).

In the present invention, the clearance portion 211 and 221 are formed in the bolt holes 210 and 220 of the insert tip 200 so that the bolt 300 is to be fitted to the cutter body 100 at a predetermined slant angle α. In this case, since the portion of the cutter body 100 required to fit the bolt 300 is reduced, the number of the insert tips 200 more than the number of the related art insert tips can be fixed to the cutter having the same diameter as that of the related art cutter. Also, the fitting force between the cutter body 100 and the insert tip 200 can be enhanced.

In addition since the bolt 300 is fitted into the cutter body 100 through the clearance portions 211 and 221, it is possible to exactly determine the position where the insert tip 200 is fixed to the cutter body 100.

INDUSTRIAL APPLICABILITY

An insert tip of the present invention has the following advantages. Since the bolt that fixes the insert tip to the cutter body is slantingly fitted to the cutter body and the bolt is slantingly received in the bolt hole formed in the insert tip, the number of the insert tips more than the number of the related art insert tips can be fixed to the cutter having the same diameter as that of the related art cutter. In this case, the time required to work the to-be-cut material is reduced to improve the productivity. Since the working surface of the to-be-cut material is even, the surface roughness is improved and chipping can be prevented from occurring in the cutting edge of the insert tip.

Further, since the lateral pressure is additionally provided to correspond to the reaction force acting on the insert tip when the insert tip is fixed to the cutter body, the fitting force against the cutting force can sufficiently be obtained. As a result, the insert tip can more firmly be fixed to the cutter body and can be prevented from being damaged.

Finally, since the bolt is fitted to the cutter body through the redundant portions, the position of the insert tip can easily be determined.

SEQUENCE LISTING cutter, insert tip, bolt, bolt hole, redundant portion

The invention claimed is:

1. An insert tip comprising:
bolt holes that communicate upper and lower surfaces of a plate shaped body with each other, the plate shaped body having a cutting edge at each corner portion, the insert tip being fixed to a cutter body by a bolt fitted into the bolt holes,
wherein clearance portions are formed only at a portion directed toward each corner portion of the insert tip among inner side portions of the bolt holes to prevent interference between the bolt holes and the bolt if the bolt is slantingly fitted from one corner portion of the insert tip, where the insert tip is worked, to its opposite corner portion.

2. The insert tip according to claim 1, wherein the clearance portions are recessed at each corner portion to fit the bolt to the cutter body at a slant angle of 8° to 20° based on a vertical line of the cutter body adjoining the bottom of the insert tip.

3. The insert tip according to claim 1, wherein the clearance portions are symmetrically formed at upper and lower portions of the bolt holes.

4. The insert tip according to claim 1, wherein the clearance portions are formed only at lower portions of the bolt holes.

5. The insert tip according to claim 2, wherein the clearance portions are symmetrically formed at upper and lower portions of the bolt holes.

6. The insert tip according to claim 2, wherein the clearance portions are formed only at lower portions of the bolt holes.

7. An insert tip for a rotatable cutter body, comprising:
a plate shaped body having a bolt hole that communicates upper and lower surfaces of the plate shaped body with each other, the plate shaped body having a cutting edge at each corner portion, wherein the bolt hole has a radial width sufficient to accept a bolt to fix the insert tip to the cutter body,
circumferentially extending clearance portions formed in said bolt hole, wherein a radial width of the bolt hole is greater at the clearance portions than at a remainder of the circumference of the bolt hole, and wherein the clearance portions are provided only at discrete separate portions of the circumference of the bolt hole, which portions are directed toward a respective corner portion of the insert tip.

8. The insert tip according to claim 7, wherein the clearance portions are recessed at a slant angle of 8° to 20° relative to a vertical line joining the upper and lower surfaces of the cutter body.

9. The insert tip according to claim 7, wherein the clearance portions are symmetrically formed at upper and lower portions of the bolt holes.

10. The insert tip according to claim 7, wherein the clearance portions are formed only at lower portions of the bolt holes.

11. The insert tip according to claim 8, wherein the clearance portions are symmetrically formed at upper and lower portions of the bolt holes.

12. The insert tip according to claim 8, wherein the clearance portions are formed only at lower portions of the bolt holes.

* * * * *